United States Patent
Hinz et al.

(10) Patent No.: US 11,168,981 B2
(45) Date of Patent: Nov. 9, 2021

(54) METHOD AND DEVICE FOR ESTIMATING A CURRENT WHEEL CIRCUMFERENCE OF AT LEAST ONE WHEEL ARRANGED ON A VEHICLE

(71) Applicant: Volkswagen Aktiengesellschaft, Wolfsburg (DE)

(72) Inventors: Olaf Hinz, Calberlah (DE); Laurens Hufer, Wolfsburg (DE); Roy Lamping, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 311 days.

(21) Appl. No.: 16/510,408

(22) Filed: Jul. 12, 2019

(65) Prior Publication Data
US 2020/0018596 A1     Jan. 16, 2020

(30) Foreign Application Priority Data
Jul. 16, 2018   (DE) .................... 10 2018 211 804.3

(51) Int. Cl.
*G01B 21/12*   (2006.01)
*G01C 22/02*   (2006.01)

(52) U.S. Cl.
CPC ............ *G01B 21/12* (2013.01); *G01C 22/02* (2013.01)

(58) Field of Classification Search
CPC ........ G01B 21/12; G01B 21/06; G01B 7/042; G01C 22/02; B60W 2050/0025;
(Continued)

(56) References Cited

U.S. PATENT DOCUMENTS

| | | | |
|---|---|---|---|
| 6,922,140 B2 | 7/2005 | Hernando et al. | 340/444 |
| 9,085,300 B2 * | 7/2015 | Bauer | G01B 21/02 |

(Continued)

FOREIGN PATENT DOCUMENTS

| | | | |
|---|---|---|---|
| DE | 10306498 A1 | 8/2004 | B60C 11/24 |
| DE | 102005050206 A1 | 4/2007 | G01C 22/00 |

(Continued)

OTHER PUBLICATIONS

German Office Action, Application No. 102018211804.3, 7 pages.

*Primary Examiner* — Yuen Wong
(74) *Attorney, Agent, or Firm* — Slayden Grubert Beard PLLC

(57) ABSTRACT

The invention relates to a method for estimating a current wheel circumference of at least one wheel arranged on a vehicle, said method comprising: determining a reference speed of the vehicle at a point in time by means of a reference apparatus, detecting a wheel rotational speed of the at least one wheel at said point in time by means of a wheel rotational speed sensor, estimating a single wheel-circumference value based on the determined reference speed and the detected wheel rotational speed for said point in time by means of a calculation apparatus, storing at least the estimated single wheel-circumference value in a circular buffer for said point in time, estimating a current wheel circumference based on the single wheel-circumference values stored in the circular buffer by the calculation apparatus, outputting the estimated current wheel circumference as a wheel circumference signal.

14 Claims, 5 Drawing Sheets

(58) Field of Classification Search
CPC ......... B60W 2556/15; B60W 2520/10; B60W 2520/28; B60W 40/12; B60C 23/061; B60C 2019/004; B60C 11/246
See application file for complete search history.

(56) References Cited

U.S. PATENT DOCUMENTS

| | | |
|---|---|---|
| 9,714,031 B2 | 7/2017 | Lavoie et al. |
| 2009/0071227 A1 | 3/2009 | Schmid et al. ................. 73/1.79 |
| 2009/0326733 A1 | 12/2009 | Abele et al. ....................... 701/1 |

FOREIGN PATENT DOCUMENTS

| | | | | |
|---|---|---|---|---|
| DE | 102005054141 A1 | 5/2007 | ............. | G01B 21/10 |
| DE | 102006058567 A1 | 6/2008 | ............. | B60C 23/02 |
| DE | 102008041451 A1 | 2/2010 | ............. | G01C 19/00 |
| DE | 102010007309 A1 | 8/2011 | ............. | G01P 21/00 |
| DE | 102011086490 A1 | 5/2013 | ............. | B60W 30/06 |
| DE | 102012018409 A1 | 3/2014 | ............. | B60W 30/06 |
| DE | 102012024632 A1 | 6/2014 | .......... | B60W 40/105 |
| DE | 102016103637 A1 | 9/2016 | ............. | B60W 10/04 |
| DE | 102015225702 A1 | 6/2017 | ............. | B61L 25/00 |
| EP | 1403099 A1 | 3/2004 | ............. | B60C 23/02 |
| WO | 03/008211 A1 | 1/2003 | ............. | B60C 23/06 |

* cited by examiner

METHOD AND DEVICE FOR ESTIMATING A CURRENT WHEEL CIRCUMFERENCE OF AT LEAST ONE WHEEL ARRANGED ON A VEHICLE

CROSS-REFERENCE TO RELATED APPLICATIONS

This application claims priority to German Patent Application No. DE 10 2018 211 804.3, filed on Jul. 16, 2018 with the German Patent and Trademark Office. The contents of the aforesaid Patent Application are incorporated herein for all purposes.

TECHNICAL FIELD

The invention relates to a method and a device for estimating a current wheel circumference of at least one wheel arranged on a vehicle.

BACKGROUND

For safe operation of a vehicle, in particular a motor vehicle, it is essential for a driver and/or for assistance systems of the vehicle to know a reliable value for a current speed of the vehicle. In this regard, legal provisions may require the display or provision of a value for the speed that is never too low.

In general, the speed of the vehicle is determined from a wheel rotational speed detected at least one wheel, which can usually also be referred to as a tire, and from an estimated wheel circumference. The value used for the wheel circumference is calculated using a mean value of the wheel circumferences of the tire types provided and/or permitted for the relevant vehicle and said value is provided with an additional margin of safety. Said wheel circumference is static and always greater than the actual wheel circumference.

Furthermore, it is known to estimate a current wheel circumference in consideration of a speed-induced expansion of the tires, for example by increasing the value used for the wheel circumference depending on the speed.

Since the actual tire size and actual wheel circumference are not known, these cannot be considered to a sufficient extent in the known methods. This may result in wheel circumferences that differ by a few centimeters, depending on the range of tires provided for a vehicle and the respective tire tolerances, for example. This produces excessive deviations during the calculation of the speed of the vehicle.

A method and an arrangement for determining an updated wheel circumference of at least one wheel arranged on a vehicle is known from DE 10 2006 058 567 A1, the at least one wheel being assigned at least one wheel circumference in a control unit and the wheel speed being determined by means of the control unit depending on the rotational speed of the at least one wheel and regardless of the assigned wheel circumference. According to the method, a reference speed of the vehicle and/or wheel that is independent of the determined wheel speed is determined, the deviation between the at least one wheel speed and the reference speed is ascertained, and the updated wheel circumference of the at least one wheel is determined depending on said deviation.

SUMMARY

An object of the invention is to provide a method and a device for estimating a current wheel circumference of at least one wheel arranged on a vehicle, it being possible to estimate the current wheel circumference in an improved manner.

The object is solved by a method and a device according to the independent claims. Various embodiments are discussed in the dependent claims and the following description.

In one aspect, a method for estimating a current wheel circumference of at least one wheel arranged on a vehicle is provided, said method comprising the following steps:
  determining a reference speed of the vehicle at a point in time by a reference apparatus,
  detecting a wheel rotational speed of the at least one wheel at said point in time by a wheel rotational speed sensor,
  estimating a single wheel-circumference value based on the determined reference speed and the detected wheel rotational speed for said point in time by a calculation apparatus,
  storing at least the estimated single wheel-circumference value in a circular buffer for said point in time,
  repeating the preceding steps for at least one other point in time,
  estimating a current wheel circumference based on the single wheel-circumference values stored in the circular buffer by the calculation apparatus and
  outputting the estimated current wheel circumference as a wheel circumference signal.

In another aspect, a device for estimating a current wheel circumference of at least one wheel arranged on a vehicle is provided, said device comprising an input apparatus, a calculation apparatus, a circular buffer, and an output apparatus. The input apparatus is configured to receive a determined reference speed of the vehicle from a reference apparatus at least one point in time and to receive a wheel rotational speed of the at least one wheel from a wheel rotational speed sensor at the at least one point in time. The calculation apparatus is configured to estimate a single wheel-circumference value based on the received reference speed and the received wheel rotational speed for the at least one point in time and to store at least the estimated single wheel-circumference value in the circular buffer. The calculation apparatus is further configured to estimate a current wheel circumference based on single wheel-circumference values stored in the circular buffer for a plurality of points in time. The output apparatus is configured to output the estimated current wheel circumference as a wheel circumference signal.

BRIEF DESCRIPTION OF THE DRAWINGS

Figure 1:
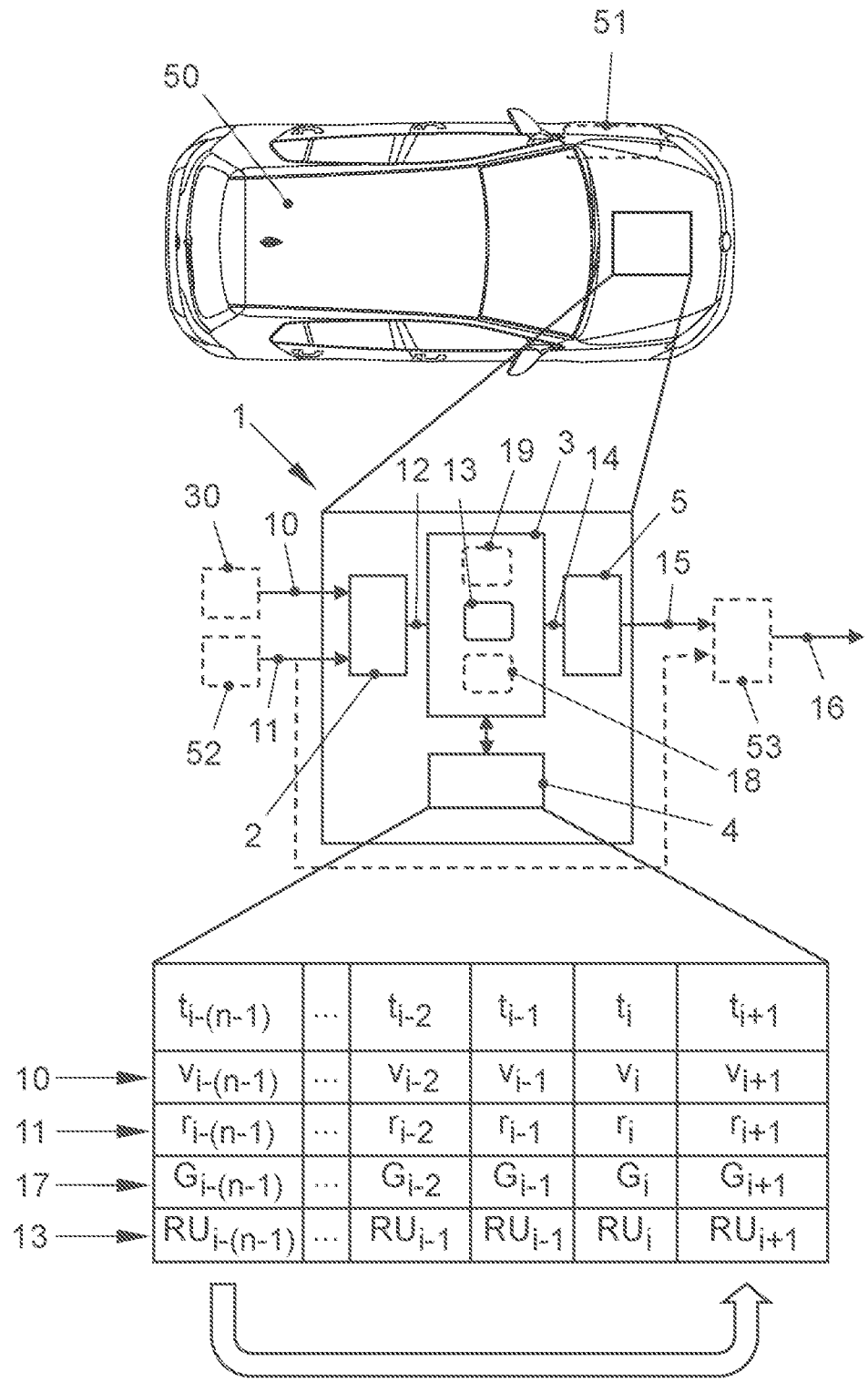
Figure 2:
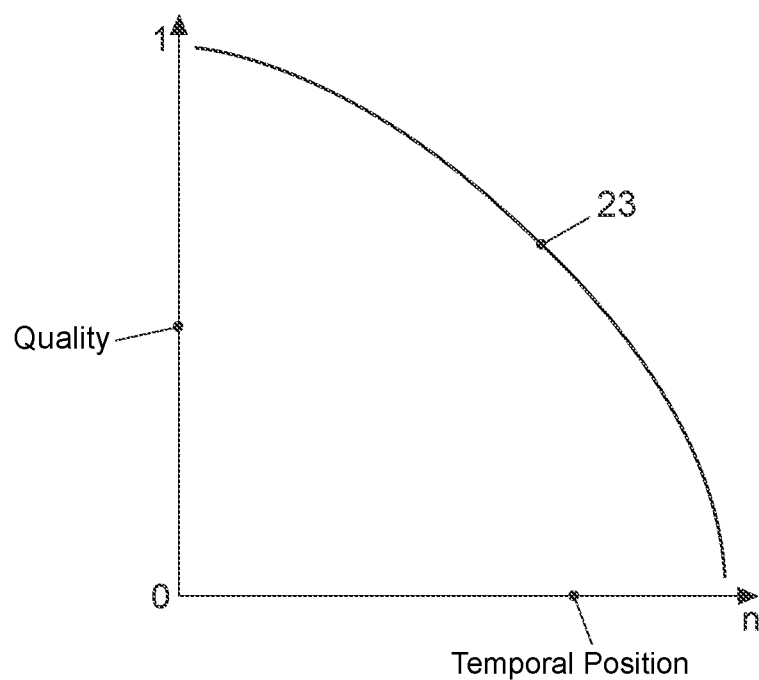
Figure 3:
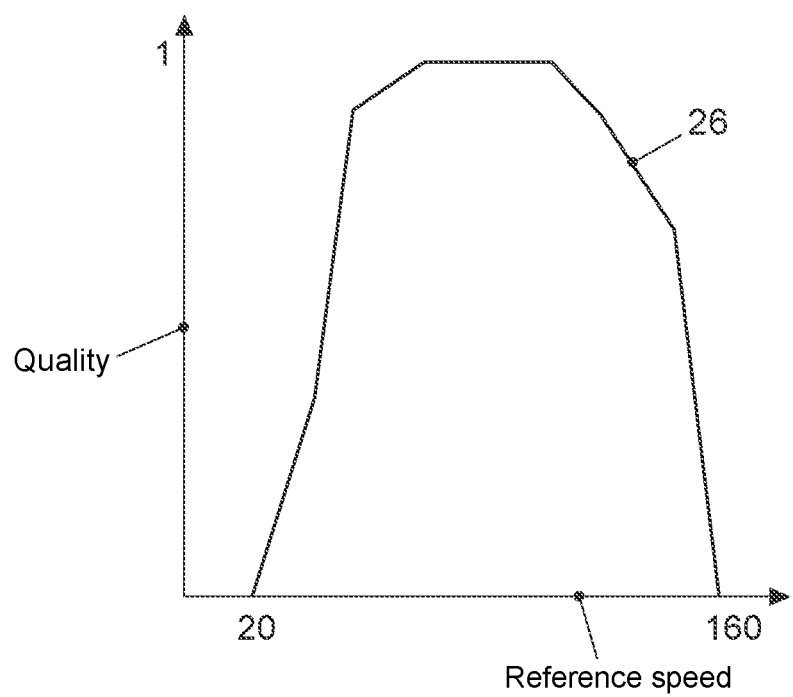
Figure 4:
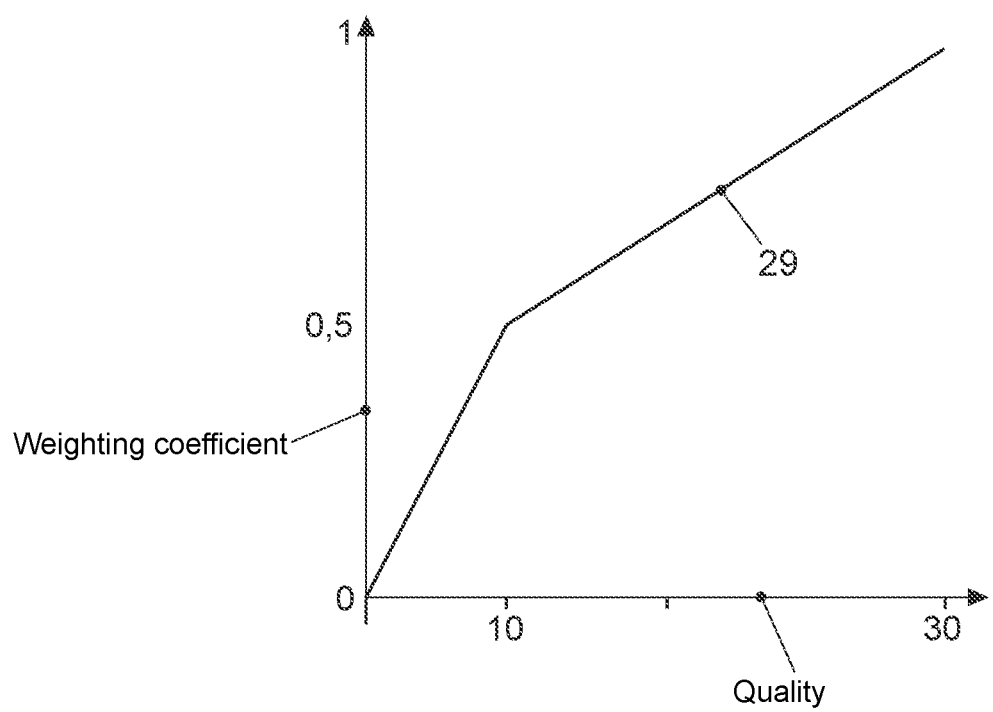
Figure 5:
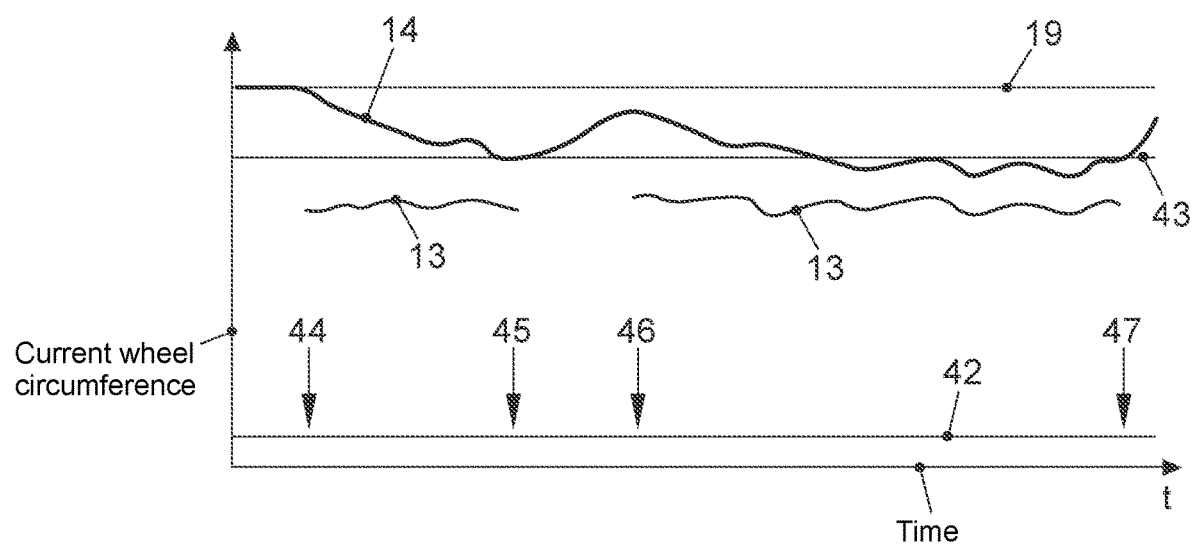
Figure 6:
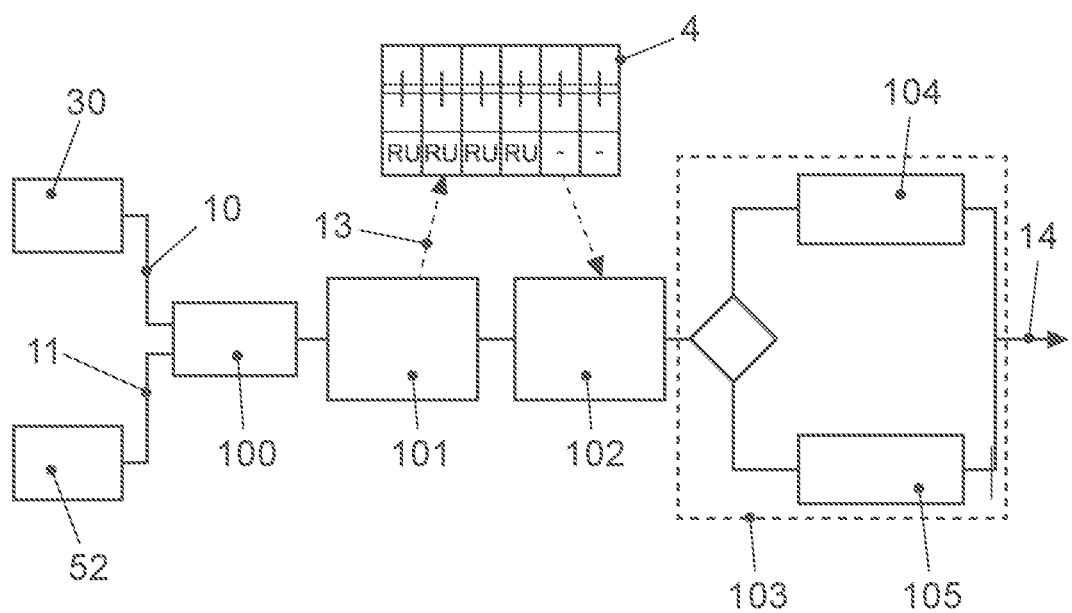

IN THE FIGS.:

FIG. 1 is a schematic representation of an embodiment of a device for estimating a current wheel circumference of one wheel arranged on a vehicle;

FIG. 2 shows a characteristic curve for determining the quality depending on the age of one wheel-circumference value in the circular buffer;

FIG. 3 shows a characteristic curve for determining the quality depending on the reference speed;

FIG. 4 shows a characteristic curve for determining a weighting depending on an overall quality of the circular buffer;

FIG. 5 shows a schematic temporal progression of an estimated current wheel circumference for the purpose of clarifying a method, in particular with respect to a learning and unlearning behavior; and FIG. 6 is a schematic signal flow diagram of an embodiment of a method for estimating a current wheel circumference of at least one wheel arranged on a vehicle.

DETAILED DESCRIPTION

In one aspect, a method for estimating a current wheel circumference of at least one wheel arranged on a vehicle is provided, said method comprising the following steps:
  (a) determining a reference speed of the vehicle at a point in time by means of a reference apparatus,
  (b) detecting a wheel rotational speed of the at least one wheel at said point in time by means of a wheel rotational speed sensor,
  (c) estimating a single wheel-circumference value based on the determined reference speed and the detected wheel rotational speed for said point in time by means of a calculation apparatus,
  (d) storing at least the estimated single wheel-circumference value in a circular buffer for said point in time,
  (e) repeating steps (a) to (d) for at least one other point in time,
estimating a current wheel circumference based on the single wheel-circumference values stored in the circular buffer by means of the calculation apparatus and outputting the estimated current wheel circumference as a wheel circumference signal.

A basic concept of the present aspect is to estimate a single wheel-circumference value for each of a plurality of points in time, i.e., a value for the wheel circumference of the at least one wheel at a point in time. The relevant estimation may be carried out by means of a calculation apparatus based on the reference speed of the vehicle determined and/or received for a particular point in time and on the wheel rotational speed detected and/or received for said particular point in time, in that the reference speed is divided by the wheel rotational speed. The reference speed refers to a speed which is determined independently of a wheel rotational speed, wheel circumference and/or number of revolutions per unit time of the at least one wheel.

A circular buffer is populated with values successively in this way after start of travel. New values may be added every second, for example. If all storage locations of the circular buffer are occupied, the oldest values are discarded and replaced by current values. If, for example, the circular buffer comprises 30 storage locations for the single wheel-circumference values and if a current single wheel-circumference value is added every second, in total the circular buffer will comprise values for a time period of 30 seconds. A current wheel circumference is estimated based on said single wheel-circumference values stored in the circular buffer by means of the calculation apparatus and is subsequently output as a wheel circumference signal. Said wheel circumference signal may be output in an analog and/or a digital manner, for example in the form of a corresponding data packet.

A current speed of the vehicle may be estimated based on the wheel circumference signal. For this purpose, the current wheel circumference encoded in the wheel circumference signal may in some embodiments be multiplied by a current wheel rotational speed. The result produces an estimation of the current speed of the vehicle.

The method according to the present aspect and the device as discussed in the following have the benefit that a current wheel circumference can be estimated in an improved manner and in particular dynamic effects, which cause the wheel circumference to change, for example acceleration, an increased speed, progressive abrasion of the tire and/or expansion of the tire, can be better taken into consideration. The method and the device make it possible to provide an improved estimation of the speed using the estimated current wheel circumference and the wheel rotational speed, which can also be calculated in accordance with the increased requirements of the European New Car Assessment Programme (Euro-NCAP).

The reference apparatus may for example be a global navigation satellite system (GNSS), for example NAVSTAR GPS (USA), GLONASS (Russia), Galileo (Europe), or Beidou (China). In order to determine the reference speed, an associated signal of the global navigation satellite system may be received and evaluated. The determined reference speed may then be transmitted to the input apparatus and/or calculation apparatus. In some embodiments the reference speed is calculated by means of the Doppler effect.

Alternatively or additionally and in some embodiments, the reference apparatus may be a laser system, a radar apparatus, and/or a camera, which are configured to determine and provide a current reference speed of the vehicle. A plurality of reference apparatuses may also be used and the respectively determined reference speeds of said reference apparatuses may be merged into one reference speed.

The wheel rotational speed may in some embodiments be detected by a wheel rotational speed sensor and supplied to the input apparatus and/or calculation apparatus as a wheel rotational speed signal. The wheel rotational speed may also be provided indirectly by and/or queried from a driving dynamics control system (e.g., electronic stability control, ESC) of the vehicle.

Furthermore, it is possible in some embodiments for the reference speed and wheel rotational speed associated with a particular single wheel-circumference value to also be stored in the circular buffer, and not merely the single wheel-circumference values.

In some embodiments, the current wheel circumference is estimated based on a weighted mean value of the single wheel-circumference values stored in the circular buffer. In the simplest case, the weighting can be the same for each of the single wheel-circumference values. However, it may also be possible that the weighting is different for each single wheel-circumference value. For example, older single wheel-circumference values may be given a lower weighting than more current single wheel-circumference values.

In some embodiments, a validity of the reference speed and wheel rotational speed is checked in each case, the single wheel-circumference value only being estimated and stored for a point in time if the reference speed and wheel rotational speed are valid for said point in time. The reference speed and wheel rotational speed are considered valid, for example, if a single wheel-circumference value estimated therefrom is within a predefined tolerance range. Said tolerance range is for example defined as follows: A maximum value is estimated based on the wheel circumference of the largest tire provided and/or permitted for the vehicle. A margin of tolerance of, for example, 1.5% is also added to said estimation. The result constitutes the upper limit for the range in which an estimated single wheel-circumference value must lie. The lower limit of said range is correspondingly calculated on the basis of the wheel circumference of the smallest tire provided and/or permitted, reduced by a margin of tolerance of, for example, 2.5%. If the estimated single wheel-circumference value is within this range, the data pair consisting of reference speed and wheel rotational speed is considered valid, otherwise the data pair is discarded.

The validity may also be determined in some embodiments based on additional parameters of the reference speed and/or wheel rotational speed. These may for example include a resolution, delay, age, quality, or residual error probability of the corresponding measured value for the reference speed and/or wheel rotational speed. In case of the wheel rotational speed, a currently measured degree of slippage, an inclination, lateral acceleration, longitudinal acceleration, a steering angle, and/or controlled braking operations may also be considered in corresponding embodiments.

In some embodiments, the quality of the single wheel-circumference values stored in the circular buffer is determined/ascertained. Said determined quality of each of the single wheel-circumference values may then be considered during weighting, for example.

In some embodiments, the quality is determined in each case depending on the age of the single wheel-circumference values in the circular buffer. In particular and in some embodiments, the quality of a single wheel-circumference value in the circular buffer may be reduced with increasing age, such that the currently added single wheel-circumference value is of greater quality.

In some embodiments, the quality is determined in each case depending on the determined reference speed associated with the relevant single wheel-circumference values. This way, the fact that a reference speed can be determined in a particularly reliable manner in certain speed ranges but less reliably in others can be taken into consideration. For example, it has been shown that a reference speed determined by means of a GNSS, in the range of 20 km/h to 120 km/h can be determined in a more reliable manner than speeds above or below said range. The quality may for example be defined as a function of the speed in the form of a characteristic curve.

The quality may also be determined depending on additional parameters in some embodiments. A parameter of this kind may for example be the quality of the reference speed and/or reference apparatus, for example the quality of the signal delivered by a GNSS. A change in speed, an acceleration and/or the duration of an acceleration phase at the point in time in question may also influence the quality.

For example, the single wheel-circumference values may each be weighted by their quality during estimation of the current wheel circumference, it then being necessary to normalize the result.

In some embodiments, an overall quality of the circular buffer is determined, the current wheel circumference additionally being estimated on the basis of the determined overall quality of the circular buffer. The overall quality is for example calculated based on a sum of the individual qualities of the single wheel-circumference values in the circular buffer. The sum may, e.g., be normalized by means of a maximum possible quality by dividing the sum of qualities by the maximum possible quality. The overall quality of the circular buffer is a measure of how reliable an estimated current wheel circumference is.

In some embodiments, the current wheel circumference is estimated based on a characteristic curve, the characteristic curve defining a weighting between a wheel circumference estimated on the basis of the single wheel-circumference values stored in the circular buffer and a fallback wheel circumference depending on the overall quality of the circular buffer. This has the benefit that learning and unlearning of a wheel circumference is made possible. For example, if there are reference speeds for populating the circular buffer with single wheel-circumference values, an improved wheel circumference can be taught proceeding from the fallback wheel circumference. If there are no longer any reference speeds at a later point in time, for example because the reference apparatus is no longer delivering any signal or the signal is of insufficient quality, the wheel circumference is then gradually restored to the fallback wheel circumference, i.e., an estimated wheel circumference is unlearned gradually. As a result, even in the event of the reference apparatus, such as a GNSS, failing, a reliable value that complies with the required specifications at all times is selected for the wheel circumference.

The individual weightings can be defined for example by means of a coefficient characteristic curve that is dependent on the overall quality. The current wheel circumference can then be estimated as follows:

Current wheel circumference=(coefficient from characteristic curve)*(wheel circumference estimated using single wheel–circumference values)+(1–coefficient from characteristic curve)*fallback wheel circumference Over a course of the characteristic curve, a learning and unlearning behavior of the method and/or device can be influenced during estimation of the current wheel circumference in some embodiments. For example, by means of the characteristic curve, the value for the estimated current wheel circumference in the region of low overall quality of the circular buffer can be set such that it can move away only very slowly from the fallback wheel circumference. However, in the region of greater overall quality of the circular buffer, the weighting can be selected such that the current wheel circumference estimated based on the stored single wheel-circumference values can move away far more rapidly from the fallback wheel circumference.

The learning and unlearning behavior may also be made to depend on other or additional variables. For example, the wheel circumference may be unlearned if a particular inclination is measured. Said unlearning may also take place during travel through a tunnel.

In some embodiments, the associated determined reference speed at a relevant point in time is additionally stored in the circular buffer, the current wheel circumference being estimated exclusively on the basis of the single wheel-circumference values in the circular buffer of which the associated reference speeds correspond to a speed range within which a speed of the vehicle lies at a current point in time. As a result, the current wheel circumference can be estimated in an improved manner, since said wheel circumference can be estimated specially for a particular speed range.

It is also possible in some embodiments for the method to be carried out for more than one wheel of the vehicle, i.e., at least one additional wheel or even all wheels of the vehicle. The method then provides an associated estimated current wheel circumference for each of the wheels.

The estimated current wheel circumference and/or wheel circumference signal may in some embodiments be limited with regard to a rate of change prior to being output and/or provided, for example limited to a maximum rate of change of 20 mm/s. As a result, an excessively fast change of the estimated wheel circumference may be prevented.

In another aspect, a device for estimating a current wheel circumference of at least one wheel arranged on a vehicle is provided, said device comprising an input apparatus, a calculation apparatus, a circular buffer, and an output apparatus. The input apparatus is configured to receive a determined reference speed of the vehicle from a reference apparatus at least one point in time and to receive a wheel rotational speed of the at least one wheel from a wheel rotational speed sensor at the at least one point in time. The calculation apparatus is configured to estimate a single wheel-circumference value based on the received reference speed and the received wheel rotational speed for the at least one point in time and to store at least the estimated single wheel-circumference value in the circular buffer. The calculation apparatus is further configured to estimate a current wheel circumference based on single wheel-circumference values stored in the circular buffer for a plurality of points in time. The output apparatus is configured to output the estimated current wheel circumference as a wheel circumference signal.

The individual embodiments of the method, described in the preceding, may be implemented correspondingly in the device of the present aspect, the device in each case being configured to carry out the corresponding method or one or more method steps of the method. The benefits of corresponding embodiments of the device are the same as those of corresponding embodiments of the method.

In the following, the invention will be explained in greater detail based on further exemplary embodiments and with reference to the drawings.

FIG. 1 is a schematic representation of an embodiment of a device 1 for estimating a current wheel circumference 14 of one wheel 51 arranged on a vehicle 50. The device 1 comprises an input apparatus 2, a calculation apparatus 3, a circular buffer 4, and an output apparatus 5.

The input apparatus 2 receives a reference speed 10 of the vehicle 50 determined and provided by a reference apparatus 30. The reference apparatus 30 may for example be a GNSS. Furthermore, the input apparatus 2 receives a wheel rotational speed 11 of the wheel 51 of the vehicle. The wheel rotational speed 11 is detected by a wheel rotational speed sensor (not shown) and is provided as a corresponding signal for example by a driving dynamics control system 52 (ESC) of the vehicle 50. The input apparatus 2 synchronizes the reference speed 10 and the wheel rotational speed 11 in terms of their time base, such that data pairs consisting of the reference speed 10 and the wheel rotational speed 11 relate to the same point in time. The formed data pairs 12 are supplied to the calculation apparatus 3.

The calculation apparatus 3 estimates a single wheel-circumference value 13 for the data pair 12 based on the received reference speed 10 and the received wheel rotational speed 11 for the associated point in time (in FIG. 1 denoted by the index i). The estimated single wheel-circumference value 13 is subsequently stored in the circular buffer 4 for said point in time by the calculation apparatus 3.

This is carried out for additional data pairs 12 and/or additional points in time and this way the circular buffer 4 is populated with estimated single wheel-circumference values 13. Current estimated single wheel-circumference values 13 may for example be stored in the circular buffer 4 every second. If the circular buffer 4 comprises 30 storage locations, for example, values will therefore be stored successively for the last 30 seconds in each case.

The calculation apparatus 3 estimates a current wheel circumference 14 based on the single wheel-circumference values 13 stored in the circular buffer 4 for the plurality of points in time.

The current wheel circumference 14 may be estimated based on a weighted mean value of the single wheel-circumference values 13 stored in the circular buffer 4.

The output apparatus 5 subsequently outputs the estimated current wheel circumference 14 as a wheel circumference signal 15. Said wheel circumference signal 15 may be analog or digital, for example in the form of a corresponding data packet. A current speed 16 of the vehicle 50, in particular, can be calculated based on the current wheel circumference 14 and/or wheel circumference signal 15 by multiplying the current wheel circumference 14 and/or wheel circumference signal 15 by the wheel rotational speed 11, for example in a control system 53 of the vehicle 50.

A validity of the reference speed 10 and wheel rotational speed 11 can be checked in each case, the single wheel-circumference value 13 only being estimated and stored for a point in time if the reference speed 10 and wheel rotational speed 11 are valid for said point in time. The reference speed 10 and wheel rotational speed 11 are valid, for example, if the single wheel-circumference value 13 calculated therefrom lies within a predefined range.

The quality 17 of the single wheel-circumference values 13 stored in the circular buffer 4 can be determined. Said quality 17 may for example be the starting point for the selection of the weightings of the single wheel-circumference values 13 during estimation of the current wheel circumference 14.

The quality 17 may be determined in each case depending on the age of the single wheel-circumference values 13 in the circular buffer 4. A characteristic curve for ascertaining the quality 17 depending on the age is shown by way of example in FIG. 2. The age, i.e., temporal position, of the relevant single wheel-circumference value 13 in the circular buffer 4 is shown on the x-axis 20. As a maximum, the age can adopt a value that corresponds to a number n of storage locations in the circular buffer 4. The y-axis 21 shows the quality 17, which is assigned to the corresponding age. The curve 22 formed shows that, in this example, the quality 17 decreases ever more strongly with age.

Alternatively or additionally, the quality 17 can be determined in each case depending on the determined reference speed 10 associated with the relevant single wheel-circumference values 13. A characteristic curve for determining the quality 17 depending on the reference speed 10 is shown by way of example in FIG. 3. The reference speed 10 of the vehicle 50 in km/h is shown on the x-axis 24. The y-axis 25 shows the quality 17, which is assigned to the corresponding reference speed 10. The curve 26 shown by way of example in FIG. 3 in particular takes into account the fact that the quality 17 decreases markedly below a speed of 20 km/h and above a speed of 160 km/h. This is the case for example with a reference speed 10 provided by means of a GNSS.

If the quality 17 is ascertained depending on a plurality of parameters, the corresponding values are multiplied by one another.

An overall quality 18 of the circular buffer 4 can be determined by the calculation apparatus 3, the current wheel circumference 14 additionally being estimated on the basis of the ascertained overall quality 18 of the circular buffer 4. For example, if a maximum quality 17 of each single wheel-circumference value 13 is equal to 1 and if the circular buffer 4 comprises 30 storage locations, for example, the overall quality 18 can adopt the value of 30 as a maximum without renewed normalization.

Furthermore, the current wheel circumference 14 can be estimated based on a characteristic curve, the characteristic curve defining a weighting between a wheel circumference estimated on the basis of the single wheel-circumference values 13 stored in the circular buffer 4 and a fallback wheel circumference 19 depending on the overall quality 18 of the circular buffer 4. The fallback wheel circumference 19 is in particular a legally prescribed value for the wheel circumference. The value is calculated on the basis of a wheel circumference averaged from the tires provided for the vehicle 50, a margin of safety of, for example, 4% also being added to the result.

A characteristic curve exemplifying this is shown in FIG. 4. The overall quality 18 ascertained for the circular buffer 4 at a current point in time is plotted on the x-axis 27. The y-axis 28 shows a weighting coefficient which defines a weighting between the wheel circumference estimated on the basis of the single wheel-circumference values 13 stored in the circular buffer 4 and a fallback wheel circumference 19. The larger the value of the weighting, the greater the extent to which the single wheel-circumference values 13 in the circular buffer are taken into consideration; the smaller the value of the weighting, the greater the extent to which the estimated current wheel circumference 14 corresponds to the fallback wheel circumference 19. The characteristic curve shows the extent to which the current wheel circumference 14 is learned and unlearned in relation to the constant fallback wheel circumference 19. The current wheel circumference 14 is then calculated in particular using the following equation:

Current wheel circumference=(coefficient from characteristic curve)*(wheel circumference estimated using single wheel-circumference values)+(1-coefficient from characteristic curve)*fallback wheel circumference If the overall quality is 10, for example, a coefficient of 0.5 can be read off the characteristic curve in FIG. 4. In other words, half of the wheel circumference estimated on the basis of the single wheel-circumference values 13 stored in the circular buffer 4 and half of the fallback wheel circumference 19 go into the value for the estimated current wheel circumference 14.

The associated determined reference speed 10 at a relevant point in time may also be stored in the circular buffer 4, the current wheel circumference 14 being estimated exclusively on the basis of the single wheel-circumference values 13 in the circular buffer 4 of which the associated reference speeds 10 correspond to a speed range within which a speed of the vehicle 50 lies at a current point in time. This allows improved estimation of the current wheel circumference 14, since only single wheel-circumference values 13 of an associated speed range are taken into consideration.

FIG. 5 shows a temporal progression of an estimated current wheel circumference 14 for the purpose of clarifying the method, in particular with respect to a learning and unlearning behavior of the current wheel circumference 14. The time is shown on the x-axis 40 and the current wheel circumference 14 estimated by means of the method and/or device (cf. FIG. 1) is shown on the y-axis 41. A minimum value 42, a maximum value 43 and the fallback wheel circumference 19 are drawn into the graph.

The minimum value 42 is calculated on the basis of the wheel circumference of the smallest tire provided and/or permitted, reduced by a margin of tolerance of 2.5%. The maximum value 43 is estimated based on the wheel circumference of the largest tire provided and/or permitted for the vehicle. A margin of tolerance of 1.5% is added to said estimation. The fallback wheel circumference 19 is calculated on the basis of a wheel circumference averaged from the tires provided for the vehicle 50, a margin of safety of 4% of the result also being added to the result.

In the following, a temporal progression of the estimated current wheel circumference 14 is described by way of example. At the beginning, the vehicle and the method are started. At this point, the estimated current wheel circumference 14 corresponds to the fallback wheel circumference 19, since the circular buffer has not yet been populated with a sufficient number of estimated single wheel-circumference values. At a point in time 44, the reference apparatus, for example a GNSS, provides first values for a reference speed, such that single wheel-circumference values 13 can be estimated using the reference speed and the wheel rotational speed. The single wheel-circumference values 13 are lower than the estimated current wheel circumference 14. Since the circular buffer is populated successively with additional values, its overall quality increases. As a result, the (averaged) wheel circumference estimated using the single wheel-circumference values 13 stored in the circular buffer are weighted ever more strongly during estimation of the current wheel circumference (cf. characteristic curve in FIG. 4). Until a point in time 45, the estimated current wheel circumference 14 therefore decreases and gradually approaches the (averaged) single wheel-circumference values 13.

At the point in time 45, the vehicle for example drives into a tunnel, and therefore the GNSS signal is no longer available, data pairs consisting of reference speed and wheel rotational speed are deemed invalid and therefore no more single wheel-circumference values 13 can be provided. The current wheel circumference 14 therefore starts to approach the fallback wheel circumference 19 again, since an overall quality of the circular buffer decreases with every time step (cf. FIG. 4). The vehicle only leaves the tunnel at a point in time 46, at which point the GNSS signal is available once more. The data pairs are then deemed valid once again and single wheel-circumference values 13 are estimated once more. Consequently, the estimated current wheel circumference 14 starts to approach the (averaged) single wheel-circumference values 13 in the circular buffer once again, until the GNSS signal is interrupted again at a point in time 47. After the point in time 47, the estimated current wheel circumference 14 gradually approaches the fallback circumference 19 again.

This action of approaching the (averaged) single wheel-circumference values 13 and fallback wheel circumference 19 corresponds to learning and unlearning of the (averaged) single wheel-circumference values 13. If the reference speed cannot be provided, the estimated current wheel circumference 14 falls back to the fallback wheel circumference 19 again. This way, the current wheel circumference 14 can always be estimated in a reliable manner.

FIG. 6 is a schematic signal flow diagram of an embodiment of the method for estimating a current wheel circumference of at least one wheel arranged on a vehicle. A GNSS as the reference apparatus 30 provides a reference speed 10 of the vehicle. A wheel rotational speed 11 is provided by a driving dynamics control system 52 of the vehicle, for example an ESC. In method step 100, the reference speed 10 and the wheel rotational speed 11 are synchronized with one another in terms of their time base and/or the associated point in time, i.e., data pairs consisting of a reference speed 10 and a wheel rotational speed 11 that both relate to the same point in time are created.

Subsequently, the data pairs are checked with regard to their validity in method step 101. The data pairs are deemed valid, for example, if a single wheel-circumference value 13 estimated from the reference speed 10 and wheel rotational speed 11 lies within a predetermined range (e.g., defined by the maximum value 43 and the minimum value 42 in FIG. 5). For the data pairs that are deemed valid, the single wheel-circumference value 13 calculated therefrom is stored in a circular buffer 4. The relevant associated reference speed 10 and the relevant associated wheel rotational speed 11 may also be stored in the circular buffer.

In method step 102, the quality of the single wheel-circumference values 13 stored in the circular buffer 4 is calculated. This is done, for example, on the basis of the age and/or associated reference speed 10, for example using correspondingly formed characteristic curves (cf., e.g., FIGS. 2 and 3). Furthermore, an overall quality of the circular buffer is calculated based on the quality of each single wheel-circumference value.

In method step 103, depending on whether there are corresponding single wheel-circumference values 13 and/or whether said values have been deemed valid, and depending on the calculated overall quality of the circular buffer (cf. FIG. 4), the current wheel circumference 14 is learned 104 or unlearned 105 based on the (averaged) single wheel-circumference values 13 (cf. also FIG. 5).

Finally, the estimated wheel circumference 14 is output as a wheel circumference signal and can be used, for example, to estimate a current speed of the vehicle.

REFERENCE NUMBER LIST

1 Device
2 Input apparatus
3 Calculation apparatus
4 Circular buffer
5 Output apparatus
10 Reference speed
11 Wheel rotational speed
12 Data pair
13 Single wheel-circumference value
14 Current wheel circumference
15 Wheel circumference signal
16 Current speed
17 Quality
18 Overall quality
19 Fallback wheel circumference
20 x-axis
21 y-axis
22 Curve
24 x-axis
25 y-axis
26 Curve
27 x-axis
28 y-axis
30 Reference apparatus
40 x-axis
41 y-axis
42 Minimum value
43 Maximum value
44-47 Point in time
50 Vehicle
51 Wheel
52 Driving dynamics control system
53 Control system
100-105 Method steps The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module, or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

The invention claimed is:

1. A method for estimating a current wheel circumference of at least one wheel arranged on a vehicle, said method comprising:
   determining a reference speed of the vehicle at a point in time by a reference apparatus;
   detecting a wheel rotational speed of the at least one wheel at said point in time by a wheel rotational speed sensor;
   estimating one or more single wheel-circumference values based on the determined reference speed and the detected wheel rotational speed for said point in time by a calculation apparatus;
   storing at least the estimated one or more single wheel-circumference values in a circular buffer for said point in time; wherein the circular buffer is configured to store multiple single wheel-circumference values, and, when all storage locations of the circular buffer are occupied, to replace an oldest wheel-circumference value with a current wheel-circumference value;
   estimating a current wheel circumference based on the one or more wheel-circumference values stored in the circular buffer by the calculation apparatus;
   outputting the estimated current wheel circumference as a wheel circumference signal; and
   estimating a current speed of the vehicle based on the wheel circumference signal and the detected wheel rotation speed.

2. The method according to claim 1, wherein the current wheel circumference is estimated based on a weighted mean value of the one or more single wheel-circumference values stored in the circular buffer.

3. The method according to claim 2, wherein a quality of the one or more single wheel-circumference values stored in the circular buffer is determined.

4. The method according to claim 2, wherein a validity of the determined reference speed and the detected wheel rotational speed is checked, and wherein the single wheel-circumference value only being estimated and stored for a point in time when the determined reference speed and the detected wheel rotational speed are valid for said point in time.

5. The method according to claim 1, wherein a validity of the determined reference speed and the detected wheel rotational speed is checked, and wherein the one or more single wheel-circumference values only being estimated and stored for a point in time when the determined reference speed and the detected wheel rotational speed are valid for said point in time.

6. The method according to claim 5, wherein a quality of the one or more single wheel-circumference values stored in the circular buffer is determined.

7. The method according to claim 1, wherein a quality of the one or more single wheel-circumference values stored in the circular buffer is determined.

8. The method according to claim 7, wherein the quality is determined depending on an age of the one or more single wheel-circumference values in the circular buffer.

9. The method according to claim 8, wherein the quality is determined depending on the determined reference speed associated with the respective single wheel-circumference values.

10. The method according to claim 7, wherein the quality is determined depending on the determined reference speed associated with the respective single wheel-circumference values.

11. The method according to claim 1, wherein an overall quality of the circular buffer is determined, wherein the current wheel circumference additionally being estimated on a basis of the ascertained overall quality of the circular buffer.

12. The method according to claim 11, wherein the current wheel circumference is estimated based on a characteristic curve, the characteristic curve defining a weighting between a wheel circumference estimated on a basis of the one or more single wheel-circumference values stored in the circular buffer and a fallback wheel circumference depending on the overall quality of the circular buffer.

13. The method according to claim 1, wherein respective determined reference speeds at respective points in time are also stored in the circular buffer, wherein the current wheel circumference being estimated exclusively on a basis of the single wheel-circumference values in the circular buffer of which the respective determined reference speeds correspond to a speed range within which the current speed of the vehicle lies at a current point in time.

14. A device for estimating a current wheel circumference of at least one wheel arranged on a vehicle, said device comprising:

an input apparatus;
a calculation apparatus;
a circular buffer; and
an output apparatus;
wherein the input apparatus is configured to receive a reference speed of the vehicle from a reference apparatus at least at one point in time and to receive a wheel rotational speed of the at least one wheel from a wheel rotational speed sensor at the at least one point in time;
wherein the calculation apparatus is configured to estimate one or more single wheel-circumference values based on the received reference speed and the received wheel rotational speed for the at least one point in time and to store at least the one or more estimated single wheel-circumference values in the circular buffer;
wherein the calculation apparatus is further configured to estimate a current wheel circumference based on the one or more single wheel-circumference values stored in the circular buffer for a plurality of points in time; and
wherein the output apparatus is configured to output the estimated current wheel circumference as a wheel circumference signal for estimating a current speed of the vehicle based on the wheel circumference signal and the detected wheel rotation speed.

* * * * *